(12) United States Patent
Huffer

(10) Patent No.: US 11,148,348 B2
(45) Date of Patent: Oct. 19, 2021

(54) FLEXIBLE PACKAGING STRUCTURE WITH BUILT-IN TAMPER-EVIDENCE FEATURES AND METHOD FOR MAKING SAME

(71) Applicant: Sonoco Development, Inc., Hartsville, SC (US)

(72) Inventor: Scott William Huffer, Hartsville, SC (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 0 days.

(21) Appl. No.: 16/939,454

(22) Filed: Jul. 27, 2020

(65) Prior Publication Data

US 2020/0353669 A1    Nov. 12, 2020

Related U.S. Application Data

(60) Division of application No. 16/583,407, filed on Sep. 26, 2019, now Pat. No. 10,773,452, which is a
(Continued)

(51) Int. Cl.
*B29C 59/00* (2006.01)
*B65D 75/58* (2006.01)
*B29L 9/00* (2006.01)

(52) U.S. Cl.
CPC ........ *B29C 59/007* (2013.01); *B65D 75/5833* (2013.01); *B65D 75/5855* (2013.01);
(Continued)

(58) Field of Classification Search
CPC ............ B29C 59/007; B29C 2791/009; B65D 75/5833; B65D 75/5855; B65D 2401/00; Y10T 156/1082; B29L 2009/00
(Continued)

(56) References Cited

U.S. PATENT DOCUMENTS 3,069,066 A    12/1962  Peckham
3,124,246 A     3/1964  De Remer et al.
(Continued)

FOREIGN PATENT DOCUMENTS

EP    0298054 A2    1/1989
EP    0408831 A1    1/1991
(Continued)

OTHER PUBLICATIONS

International Search Report and Written Opinion for corresponding International Application No. PCT/US2005/018614, dated Sep. 16, 2005.
(Continued)

*Primary Examiner* — Peter N Helvey
(74) *Attorney, Agent, or Firm* — Nelson Mullins Riley & Scarborough LLP

(57) ABSTRACT

A flexible packaging laminate has built-in opening/reclose and tamper-evidence features by forming the laminate from an outer structure joined in face-to-face relation to an inner structure. Score lines are formed in both structures to enable an opening to be formed through the laminate by lifting a flap or the like out of the plane of the laminate. The score line through the outer structure defines a larger opening than the score line through the inner structure, such that a marginal region of the outer structure extends beyond the edge of the opening portion of the inner structure. A pressure-sensitive adhesive is used to re-adhere the marginal region to an underlying surface of the inner structure adjacent the opening through the laminate. The outer score line includes at least one tab positioned within a heat seal region of the laminate.

4 Claims, 12 Drawing Sheets

Related U.S. Application Data continuation of application No. 15/804,793, filed on Nov. 6, 2017, now Pat. No. 10,493,688, which is a continuation-in-part of application No. 13/668,947, filed on Nov. 5, 2012, now Pat. No. 8,545,099, which is a continuation of application No. 12/043,442, filed on Mar. 6, 2008, now Pat. No. 9,975,290.

(52) U.S. Cl.
CPC ..... *B29C 2791/009* (2013.01); *B29L 2009/00* (2013.01); *B65D 2401/00* (2020.05); *Y10T 156/1082* (2015.01)

(58) Field of Classification Search
USPC .......................................................... 383/5
See application file for complete search history.

(56) References Cited

U.S. PATENT DOCUMENTS

| | | | |
|---|---|---|---|
| 3,185,578 | A | 5/1965 | Scharre |
| 3,193,978 | A | 7/1965 | Bader |
| 3,212,381 | A | 10/1965 | Heyer |
| 3,234,705 | A | 2/1966 | Schwartz |
| 3,874,143 | A | 4/1975 | Braber |
| 3,905,646 | A | 9/1975 | Brackmann et al. |
| 3,909,582 | A | 9/1975 | Bowen |
| 3,982,685 | A | 9/1976 | Shimada |
| 4,185,754 | A | 1/1980 | Julius |
| 4,260,061 | A | 4/1981 | Jacobs |
| 4,411,365 | A | 10/1983 | Horikawa et al. |
| 4,420,080 | A | 12/1983 | Nakamura |
| 4,468,811 | A | 8/1984 | Shaw et al. |
| 4,549,063 | A | 10/1985 | Ang et al. |
| 4,552,269 | A | 11/1985 | Chang |
| 4,572,377 | A | 2/1986 | Beckett |
| 4,577,761 | A | 3/1986 | Nadaskay |
| 4,586,312 | A | 5/1986 | Limousin |
| 4,610,357 | A | 9/1986 | Nakamura |
| 4,653,250 | A | 3/1987 | Nakamura |
| 4,673,601 | A | 6/1987 | Lamping et al. |
| 4,679,693 | A | 7/1987 | Forman |
| 4,681,781 | A | 7/1987 | Murray et al. |
| 4,693,365 | A | 9/1987 | Corella |
| 4,723,301 | A | 2/1988 | Chang |
| 4,739,879 | A | 4/1988 | Nakamura |
| 4,784,885 | A | 11/1988 | Carespodi |
| 4,790,436 | A | 12/1988 | Nakamura |
| 4,795,271 | A | 1/1989 | Lane et al. |
| 4,840,270 | A | 6/1989 | Caputo et al. |
| 4,868,027 | A | 9/1989 | Hunkeler et al. |
| 4,874,096 | A | 10/1989 | Tessera-Chiesa |
| 4,923,309 | A | 5/1990 | Van Erden |
| 5,060,848 | A | 10/1991 | Ewan |
| 5,065,868 | A | 11/1991 | Cornelissen et al. |
| 5,116,140 | A | 5/1992 | Hirashima |
| 5,124,388 | A | 6/1992 | Pruett et al. |
| 5,158,499 | A | 10/1992 | Guckenberger |
| 5,167,455 | A | 12/1992 | Forman |
| 5,333,735 | A | 8/1994 | Focket et al. |
| 5,464,285 | A | 11/1995 | Anderson |
| 5,531,325 | A | 7/1996 | Deflander et al. |
| 5,535,885 | A | 7/1996 | Daniel et al. |
| 5,613,779 | A | 3/1997 | Niwa |
| 5,630,308 | A | 5/1997 | Guckenberger |
| 5,683,029 | A | 11/1997 | Lyons |
| 5,836,697 | A | 11/1998 | Chiesa |
| 5,855,435 | A | 1/1999 | Chiesa |
| 5,862,101 | A | 1/1999 | Haas et al. |
| 5,908,246 | A | 6/1999 | Arimum et al. |
| 5,938,013 | A | 8/1999 | Palumbo et al. |
| 6,056,141 | A | 5/2000 | Navarini et al. |
| 6,113,271 | A | 9/2000 | Scott et al. |
| 6,120,860 | A | 9/2000 | Bowen et al. |
| 6,126,317 | A | 10/2000 | Anderson et al. |
| 6,296,884 | B1 | 10/2001 | Okerlund |
| 6,309,105 | B1 | 10/2001 | Palumbo |
| 6,383,592 | B1 | 5/2002 | Lowry et al. |
| 6,428,867 | B1 | 8/2002 | Scott et al. |
| 6,450,685 | B1 | 9/2002 | Scott |
| 6,457,585 | B1 | 10/2002 | Huffer et al. |
| 6,517,243 | B2 | 2/2003 | Huffer et al. |
| 6,554,134 | B1 | 4/2003 | Guibert |
| 6,589,622 | B1 | 7/2003 | Scott |
| 6,918,532 | B2 | 7/2005 | Sierra-Gomez et al. |
| 7,007,423 | B2 | 3/2006 | Andersson et al. |
| 7,717,620 | B2 | 5/2010 | Hebert et al. |
| 8,262,830 | B2 | 9/2012 | Hebert et al. |
| 8,262,832 | B2 | 9/2012 | Hebert et al. |
| 8,408,792 | B2 | 4/2013 | Cole et al. |
| 8,545,099 | B2 | 10/2013 | Davis et al. |
| 9,850,056 | B2 | 12/2017 | Shaw et al. |
| 2002/0114541 | A1 | 8/2002 | Huffer et al. |
| 2003/0179955 | A1 | 9/2003 | Rehwinkel |
| 2003/0231811 | A1 | 12/2003 | Hodson et al. |
| 2004/0150221 | A1 | 8/2004 | Brown |
| 2004/0206637 | A1 | 10/2004 | Sierra-Gomez et al. |
| 2005/0247764 | A1 | 11/2005 | Sierra-Gomez et al. |
| 2005/0276525 | A1 | 12/2005 | Hebert et al. |
| 2006/0018569 | A1 | 1/2006 | Bonenfant |
| 2006/0171611 | A1 | 8/2006 | Rapparini |
| 2007/0095709 | A1 | 5/2007 | Saito et al. |
| 2007/0209959 | A1 | 9/2007 | Burgess |
| 2008/0037911 | A1 | 2/2008 | Cole et al. |
| 2009/0226117 | A1 | 9/2009 | Davis et al. |
| 2010/0018974 | A1 | 1/2010 | Lyzenga et al. |
| 2012/0267386 | A1 | 10/2012 | Hebert et al. |
| 2017/0036836 | A1 | 2/2017 | Hebert et al. |
| 2018/0257294 | A1 | 9/2018 | Davis et al. |
| 2020/0016817 | A1 | 1/2020 | Huffer |

FOREIGN PATENT DOCUMENTS

| | | | |
|---|---|---|---|
| EP | 0661154 A1 | 7/1995 | |
| EP | 0796208 B1 | 9/1997 | |
| EP | 0905048 A1 | 3/1999 | |
| EP | 0957045 | 11/1999 | |
| EP | 1449789 A1 | 8/2004 | |
| EP | 2 243 716 A1 | 10/2010 | |
| EP | 2574570 A1 | 4/2013 | |
| JP | H05-49622 U | 6/1993 | |
| JP | H05-51794 U | 7/1993 | |
| JP | H10500378 A | 1/1998 | |
| JP | 2000-095282 A | 4/2000 | |
| JP | 2008-502555 A | 1/2008 | |
| JP | 2011 513153 A | 4/2011 | |
| KR | 10-2004-0025490 | 3/2004 | |
| WO | WO 95/30599 A1 | 11/1995 | |
| WO | WO 01/04020 A1 | 1/2001 | |
| WO | WO 02/066341 A1 | 8/2002 | |
| WO | WO 03/059776 A1 | 7/2003 | |
| WO | WO 2005/123535 A1 | 12/2005 | |
| WO | WO 2010/046623 A2 | 4/2010 | |
| WO | WO 2013/114091 A1 | 8/2013 | |

OTHER PUBLICATIONS

International Preliminary Report on Patentability (Chapter II) from International Application No. PCT/US2005/018614, dated Oct. 6, 2006.
International Search Report and Written of the International Searching Authority for International Application No. PCT/YS2018/046620 dated Nov. 13, 2018.
European Search Report for European Application No. 10007352.7, dated Sep. 23, 2010.
European Search Report for European Application No. EP 12 19 9183 dated Mar. 5, 2013., dated Sep. 23, 2010.
Office Action for Japanese Application No. 2013-173136, dated Sep. 29, 2015.
Communication pursuant to Rules 161(1) and 162 EPC dated Mar. 13, 2020 in corresponding European patent application No. 187602321, all enclosed pages cited.

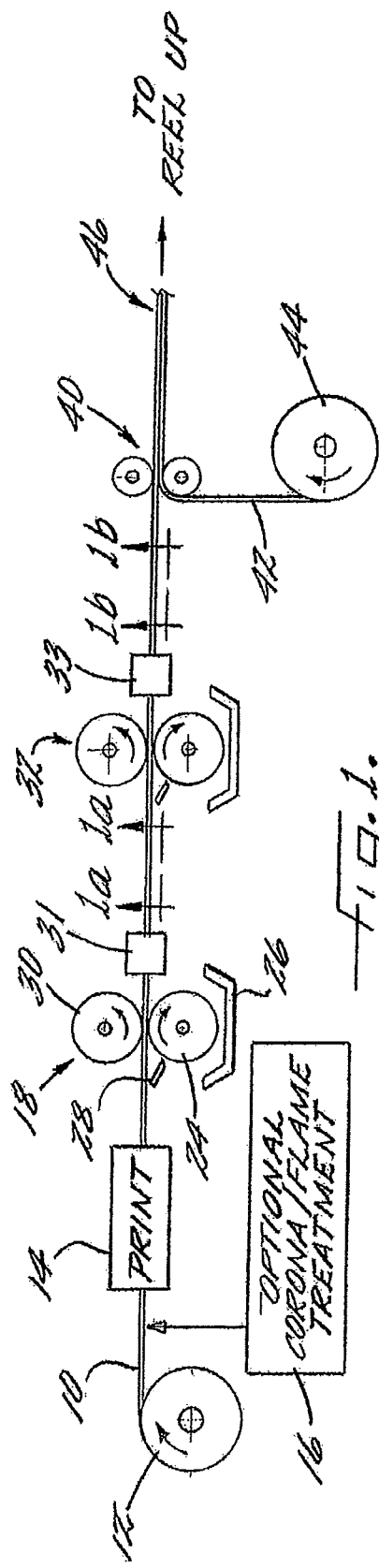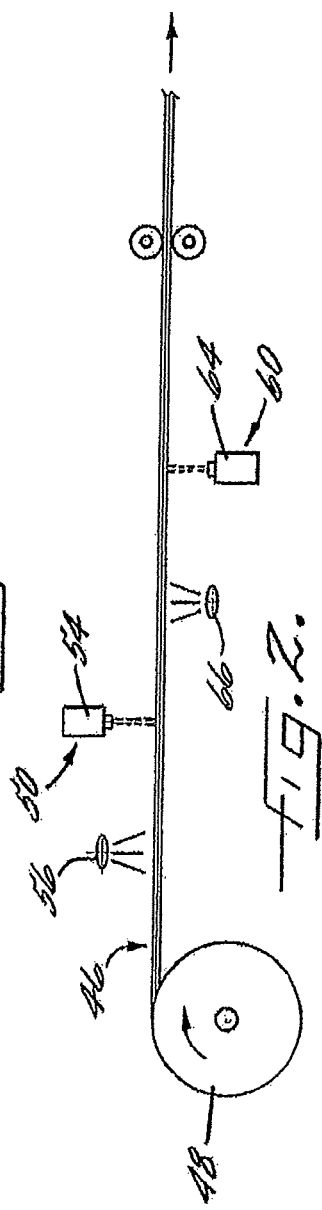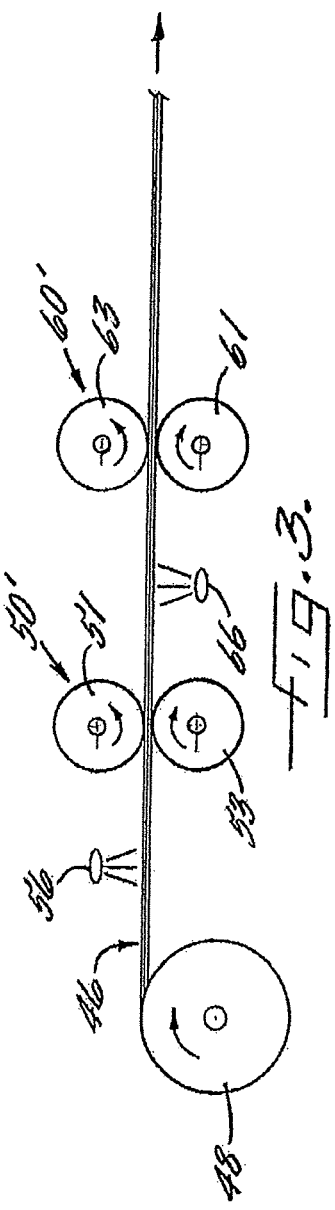

FLEXIBLE PACKAGING STRUCTURE WITH BUILT-IN TAMPER-EVIDENCE FEATURES AND METHOD FOR MAKING SAME

CROSS-REFERENCE TO RELATED APPLICATIONS

This application is a divisional of U.S. patent application Ser. No. 16/583,407 filed Sep. 26, 2019 which is a continuation of U.S. patent application Ser. No. 15/804,793, filed Nov. 6, 2017, issued as U.S. Pat. No. 10,493,688 which is a continuation-in-part of U.S. patent application Ser. No. 13/668,947, filed Nov. 5, 2012, issued as U.S. Pat. No. 8,545,099 which is a continuation of U.S. patent application Ser. No. 12/043,442, filed Mar. 6, 2008, issued as U.S. Pat. No. 9,975,290 all of which are incorporated by reference herein in their entirety.

BACKGROUND OF THE INVENTION

This disclosure relates to product packaging formed in whole or in part by a flexible film, in which the film has a score line that defines a flap that can be lifted to create an opening through the film to gain access to the product, and wherein the flap can be reattached to the remainder of the film to close the opening.

A variety of food and non-food products are packaged using flexible packaging materials formed primarily of laminations of one or more of polymer films, metallized polymer films, paper, metal foil, and the like. In many instances, packages contain products that may be used or consumed a little at a time, and the products may be susceptible to being adversely affected (e.g., becoming soggy, drying out, etc.) by exposure to the surrounding environment. Accordingly, there is frequently a desire to be able to reclose a package after its initial opening to keep product that remains in the package fresh.

Various opening and reclose arrangements have been developed for flexible packaging, for example as disclosed in U.S. patent application Ser. No. 11/098,872 ("the '872 Application"), filed on Apr. 5, 2005, incorporated herein by reference. Often, reclosability is achieved by using a pressure-sensitive adhesive label that is attached to the exterior of the package adjacent the location where the package is opened. Such labels are formed separately from the packaging structure itself and are added to the packaging structure. Thus, the labels thus represent additional expense. Furthermore, it is often necessary to ship a roll of the packaging material to a converter for application of the labels, after which the roll is shipped back to the packager for manufacture of the packages. This manufacturing process is inefficient. The use of labels also entails waste in that it is typically necessary to employ a release liner with the labels, which liner is removed and discarded. The labels are usually die cut from a web of material, and the skeleton left over after the die-cutting operation is also wasted.

Because of the drawbacks of using labels as noted above, the assignee of the present application has developed a flexible packaging structure with a built-in opening and reclose feature, as described in the aforementioned '872 application. Packages made using the flexible packaging structure of the '872 application avoid the disadvantages associated with the use of labels, and have additional advantages.

Consumers feel more confident about purchasing such types of packages if the packages have a tamper-evidence capability so that the consumer can readily see whether the package has already been opened. Presently, various flexible packages have features allowing a user to determine if a package has already been opened or tampered with. Unfortunately, the tamper-evidence features of such packages may be difficult to discern upon a visual inspection of the package. Further, such tamper-evidence features often require removing a portion of the packaging, and thus, creating unwanted trash and potential choking hazards. The present disclosure is directed toward providing improved tamper-evidence capabilities.

BRIEF SUMMARY OF THE DISCLOSURE

The present disclosure addresses the above needs and achieves other advantages, by providing a flexible packaging structure and method for making same, in which the structure has opening/reclose and tamper-evidence features built into the structure. In accordance with one embodiment of the invention, the score line or die cut through the film for creating the flap includes one or more tear portions in which the flap includes a tab with an end attached to the structure, and/or an interrupted area of the flap that is not cut. When the flap is peeled back, a portion of the tab or the film in the interrupted area is torn. The tab can include an indentation and/or a prong, while the interrupted area can be formed by a transverse cut that is U-shaped or V-shaped to ensure that the tear will connect with the die cut. The presence of a tear or slit in the tab or the interrupted area indicates that the package has already been opened or tampered with.

In some embodiments, the package itself is formed to have a built-in opening and reclose feature by forming the packaging structure as a two-part structure, having an outer structure joined in face-to-face relation with an inner structure. Each of the outer and inner structures can comprise one or more layers of flexible packaging material such as polymer film, paper, metal foil, and the like. An outer line of weakness is formed in the outer structure to define an outer opening portion that can be lifted out of the plane of the outer structure. Similarly, an inner line of weakness is formed in the inner structure to define an inner opening portion that can be lifted out of the plane of the inner structure. The outer and inner opening portions are attached to each other such that the outer and inner opening portions can be lifted out of the plane as a unit, thereby creating an opening through the packaging structure defined by the inner line of weakness. The outer line of weakness includes a tear portion whose torn or untorn condition is readily apparent from a visual inspection of the outer structure.

The outer opening portion is larger in area than the inner opening portion and has a marginal region that extends beyond the peripheral edge of the inner opening portion. When the outer and inner opening portions are lifted out of the plane to create the opening, an underlying portion of the inner structure in registration with the marginal region of the outer opening portion is exposed adjacent the opening. A pressure-sensitive adhesive is applied to either the marginal region of the outer opening portion or the underlying portion of the inner structure. Therefore, after initial lifting of the outer and inner opening portions, the opening through the structure can be reclosed by adhering the marginal region of the outer opening portion to the underlying portion of the inner structure via the pressure-sensitive adhesive.

In accordance with one embodiment, the pressure-sensitive adhesive is pattern-applied onto one surface of the outer structure, the pressure-sensitive adhesive forming a strip having an outer perimeter and an inner perimeter, and a permanent laminating adhesive is pattern-applied onto the one surface of the outer structure such that the permanent adhesive does not cover the strip of pressure-sensitive adhesive. Next, the outer structure is adhesively joined to the inner structure via the permanent adhesive so as to form a laminate. The outer structure and inner structure in preferred embodiments are coextensive with each other, and advantageously are each continuous webs drawn from respective supply rolls and laminated together to form a laminate that is a continuous web.

The laminate is then advanced to a scoring station at which an outer line of weakness (also referred to herein as a "score line") is formed through the thickness of the outer structure, and an inner score line is formed through the thickness of the inner structure. Advantageously, each of the score lines is registered with respect to the strip of pressure-sensitive adhesive such that neither score line is located where there is permanent laminating adhesive between the outer and inner structures. The outer score line delineates the outer opening portion of the outer structure that is separable from the outer structure along the outer score line, and the inner score line delineates the inner opening portion of the inner structure that is affixed to the outer opening portion by the permanent adhesive and is separable from the inner structure along the inner score line. The outer score line includes the interrupted area.

The score lines can be formed by laser scoring or by mechanical scoring or cutting such as by die cutting or kiss cutting or the like. The adhesive(s) can be applied to the outer structure as noted, but alternatively can be applied to the inner structure. The adhesive(s) can be applied using any suitable equipment and technique, such as by a gravure roll or the like.

The pressure-sensitive adhesive can be applied such that there is a region that is free of the adhesive, such as a tab, to form a grasping portion of the opening portion that can be readily grasped and pulled back to initiate opening.

The outer line of weakness or score line preferably penetrates through the thickness of the outer structure but not through the inner structure. Similarly, the inner score line preferably penetrates through the thickness of the inner structure but not through the outer structure.

The inner structure of the laminate advantageously includes a sealant layer forming the inner surface of the laminate. The sealant layer can comprise a heat seal material such as polyethylene, polypropylene, ionomer resin such as SURLYN®, or the like, or a cold seal material. The heat seal or cold seal layer can comprise either a film or a coating. The inner structure advantageously also includes a barrier layer providing a barrier against the passage of moisture and/or oxygen. In some applications such as the packaging of moisture-sensitive products (e.g., cookies or similar products that tend to be degraded when exposed to the environment), it is important to provide a moisture barrier. The barrier layer can comprise any of various polymer-based barrier materials including barrier polymer films such as ethylene vinyl alcohol copolymer (EVOH), polyamide, and the like; metallized polyolefin films such as polyethylene, polypropylene, oriented polypropylene, and the like; AlOx-coated polymer films; SiOx-coated polymer films; metal foil such as aluminum foil; and others. Although the term "barrier layer" is used in connection with metallized films to refer to the entire metallized film, it will be recognized that it is the layer of metal that provides the barrier function. Likewise, it is the AlOx or SiOx coating that provides the barrier function in the ceramic-coated films, but the entire film nevertheless is referred to herein as a "barrier layer".

The outer structure advantageously includes a layer of polyester such as polyethylene terephthalate, which has a desirable crisp feel and is readily printed. The polyester layer can be printed with inks to provide graphics and indicia. In preferred embodiments, the polyester layer is transparent and is reverse-printed on the surface that faces the inner structure.

The process in accordance with the present disclosure comprises an in-line process wherein the opening and reclose features and the tamper-evidence feature are formed in the packaging laminate during the production of the laminate. Accordingly, it is not necessary to ship the laminate to a converter for application of labels or the like. Thus, the waste and the various material and shipping expenses associated with the use of separate labels are avoided.

BRIEF DESCRIPTION OF THE SEVERAL VIEWS OF THE DRAWINGS

Figure 1A:
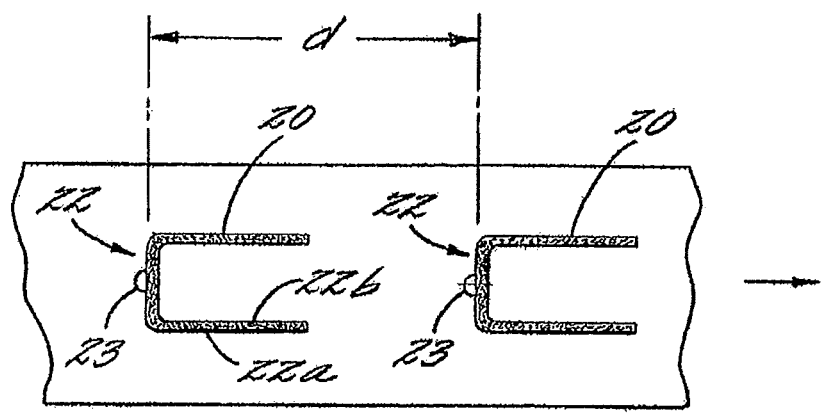
Figure 1B:
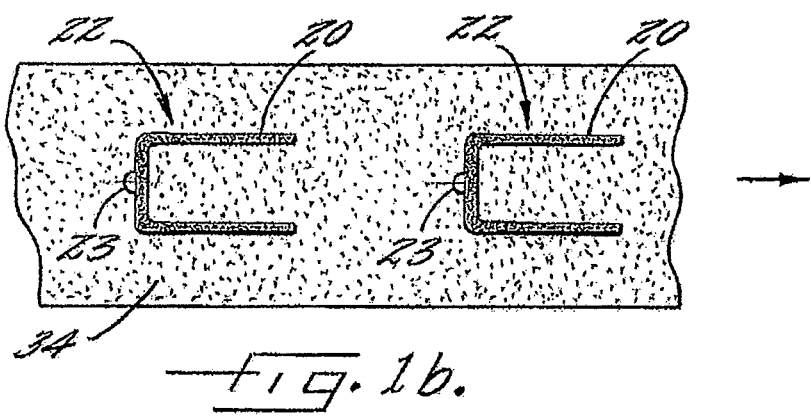
Figure 4:
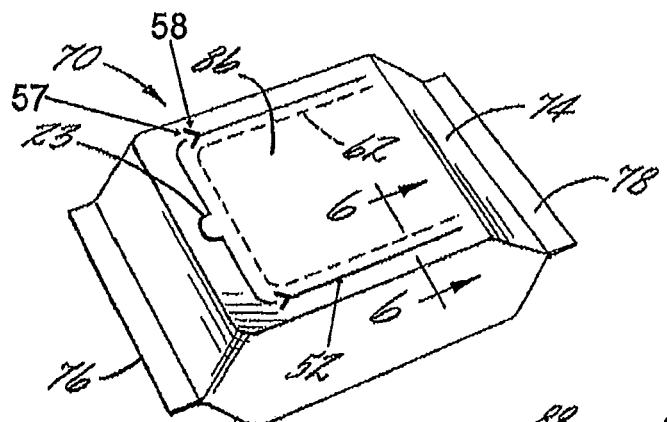
Figure 5:
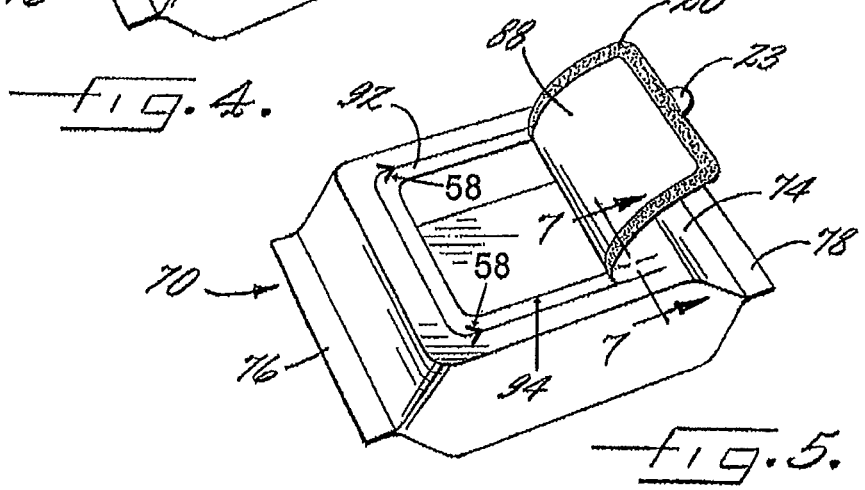
Figure 6:
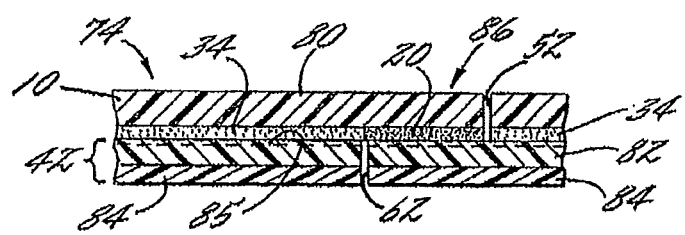
Figure 7:
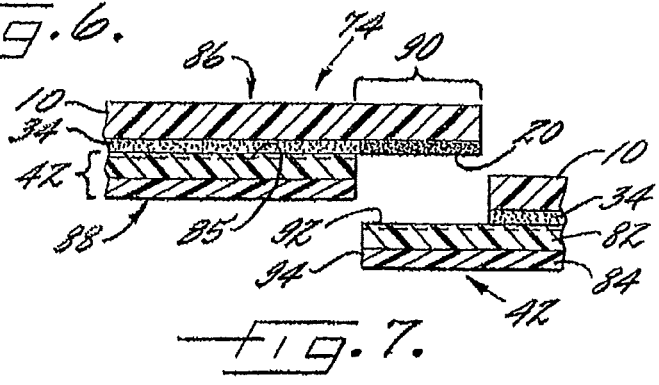
Figure 8:
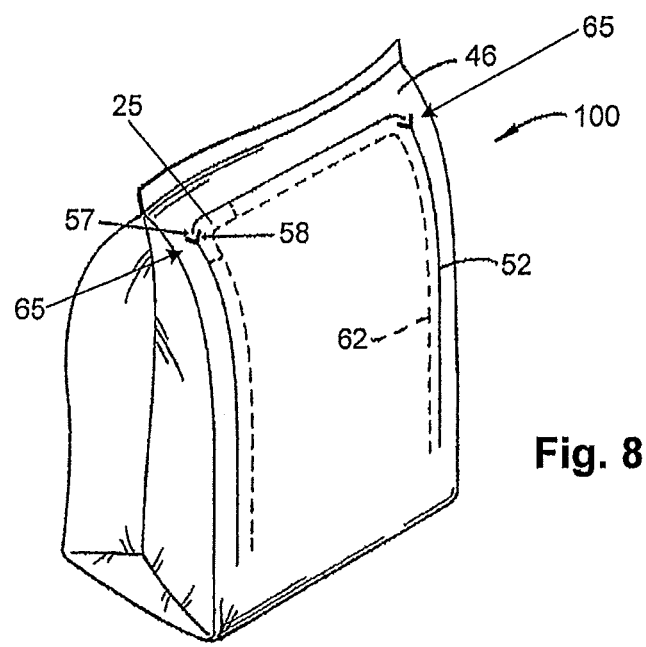
Figure 9:
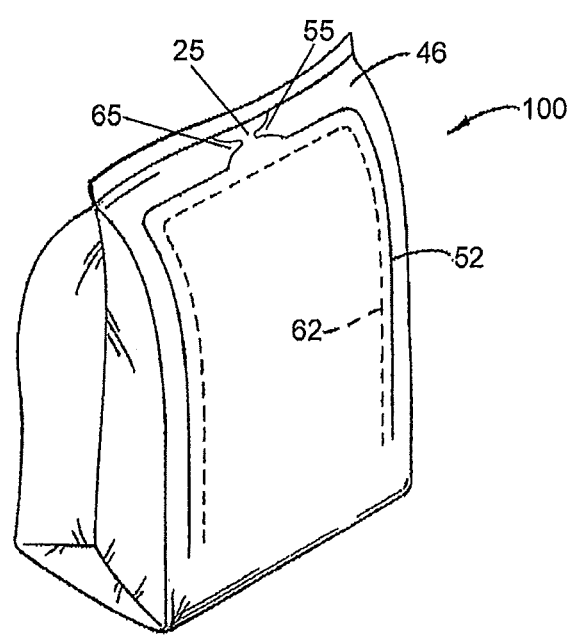
Figure 10:
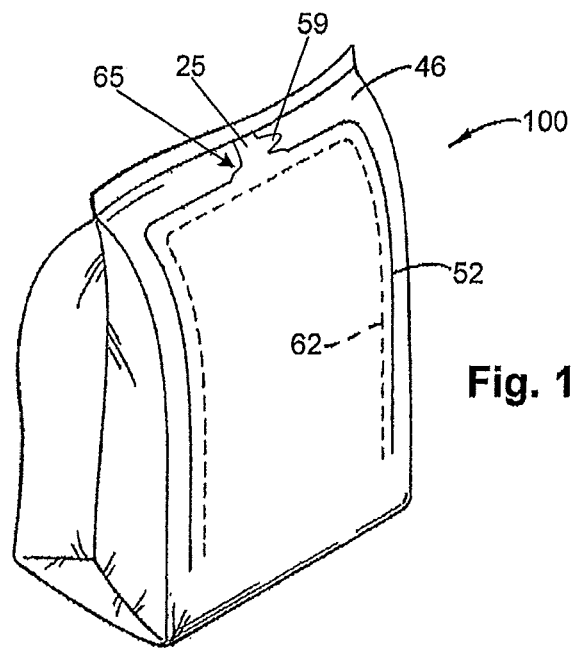
Figure 11:
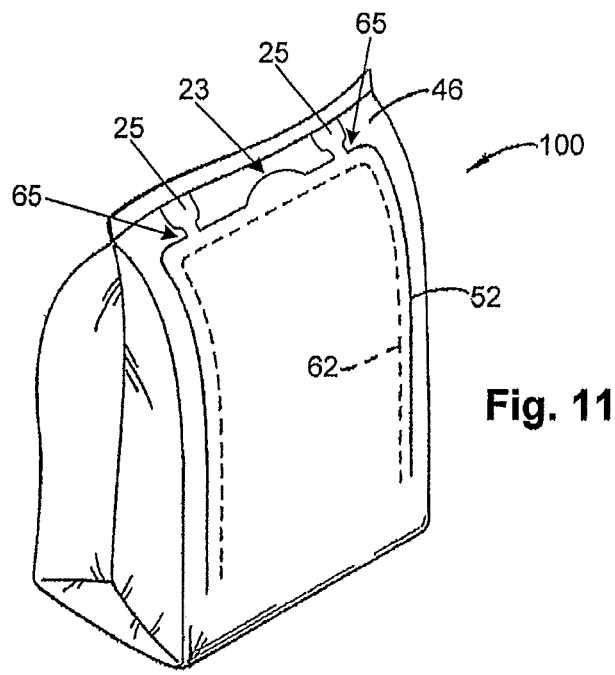
Figure 12:
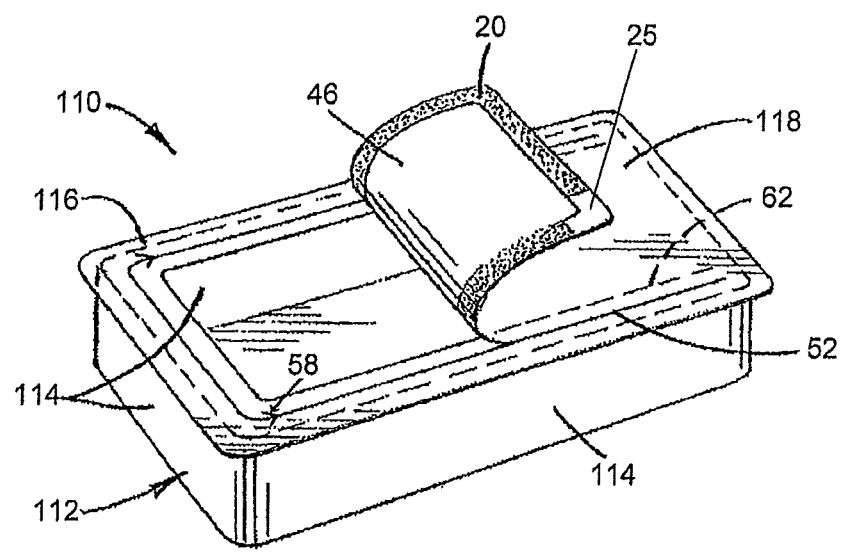
Figure 13:
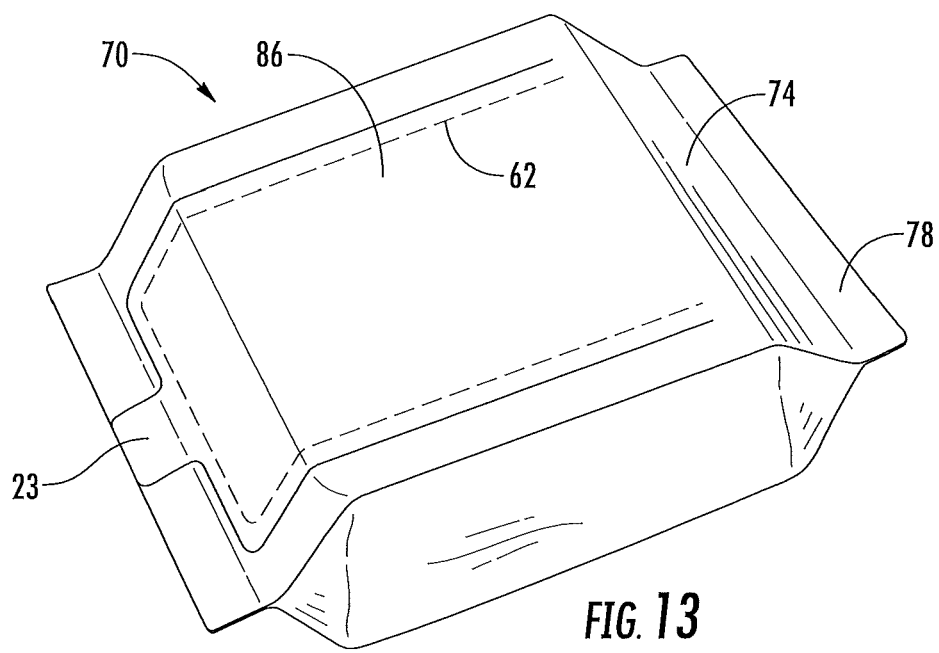
Figure 14:
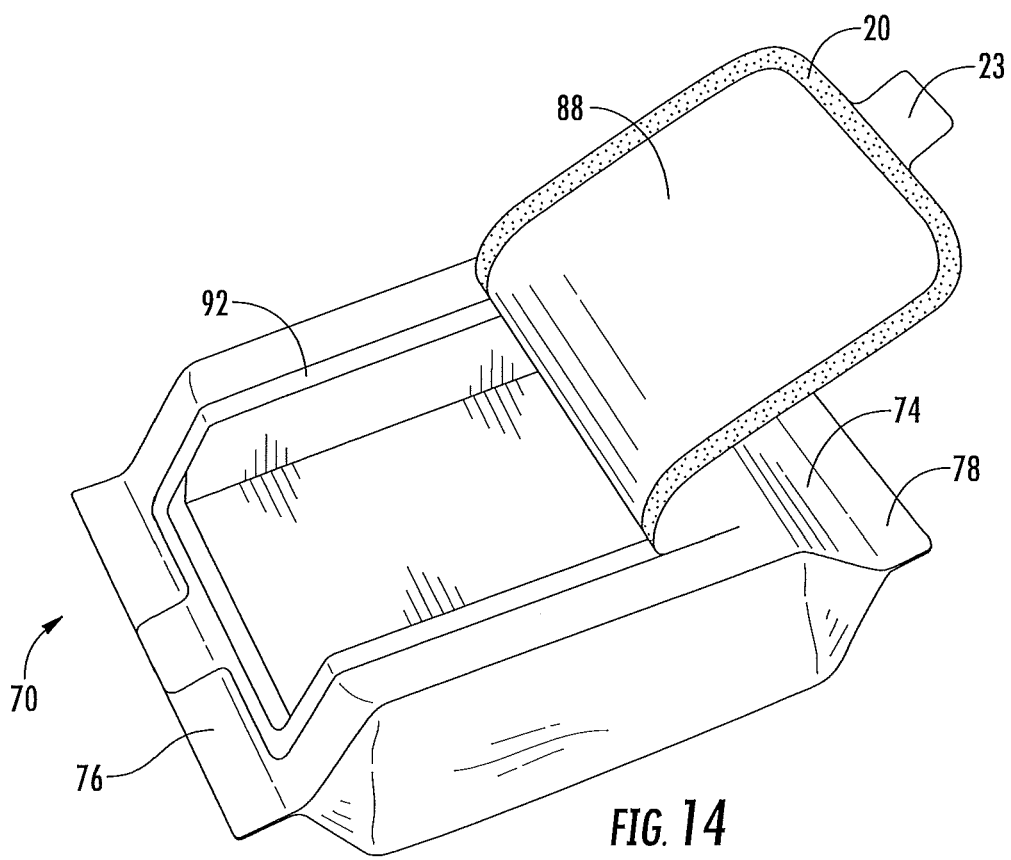
Figure 15:
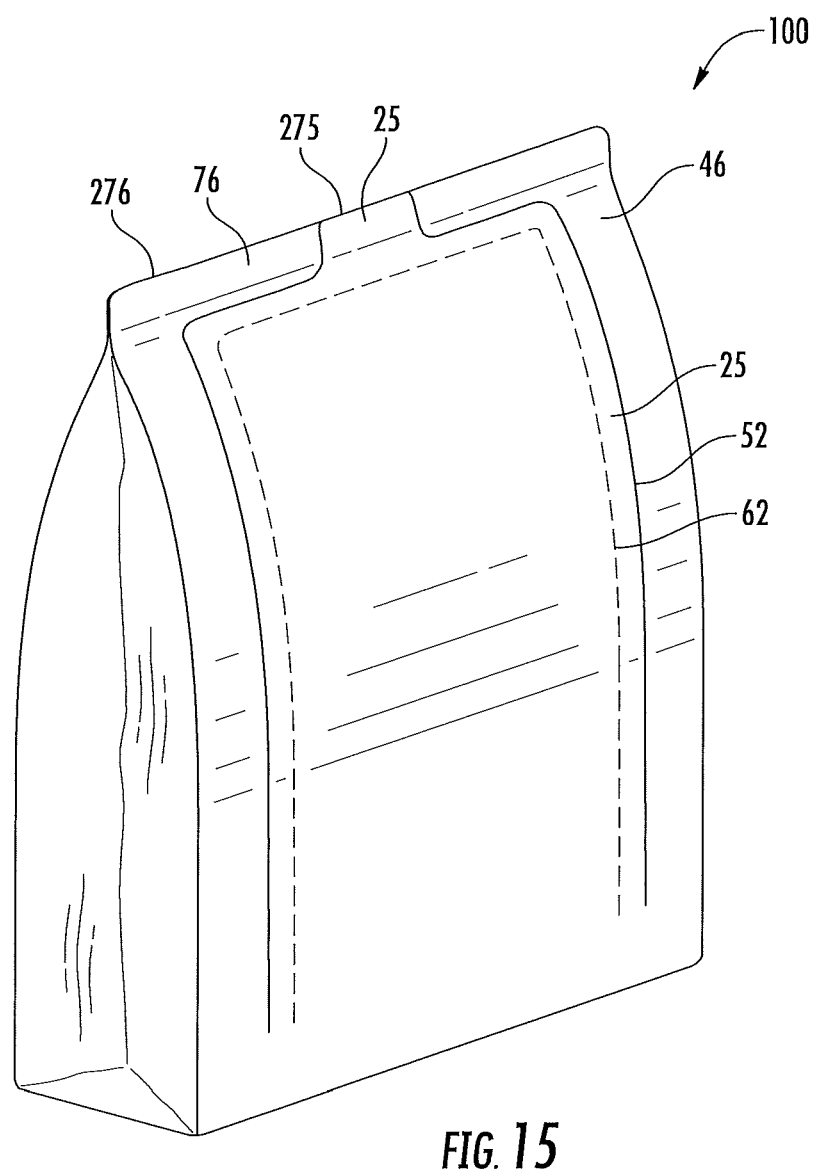
Figure 16A:
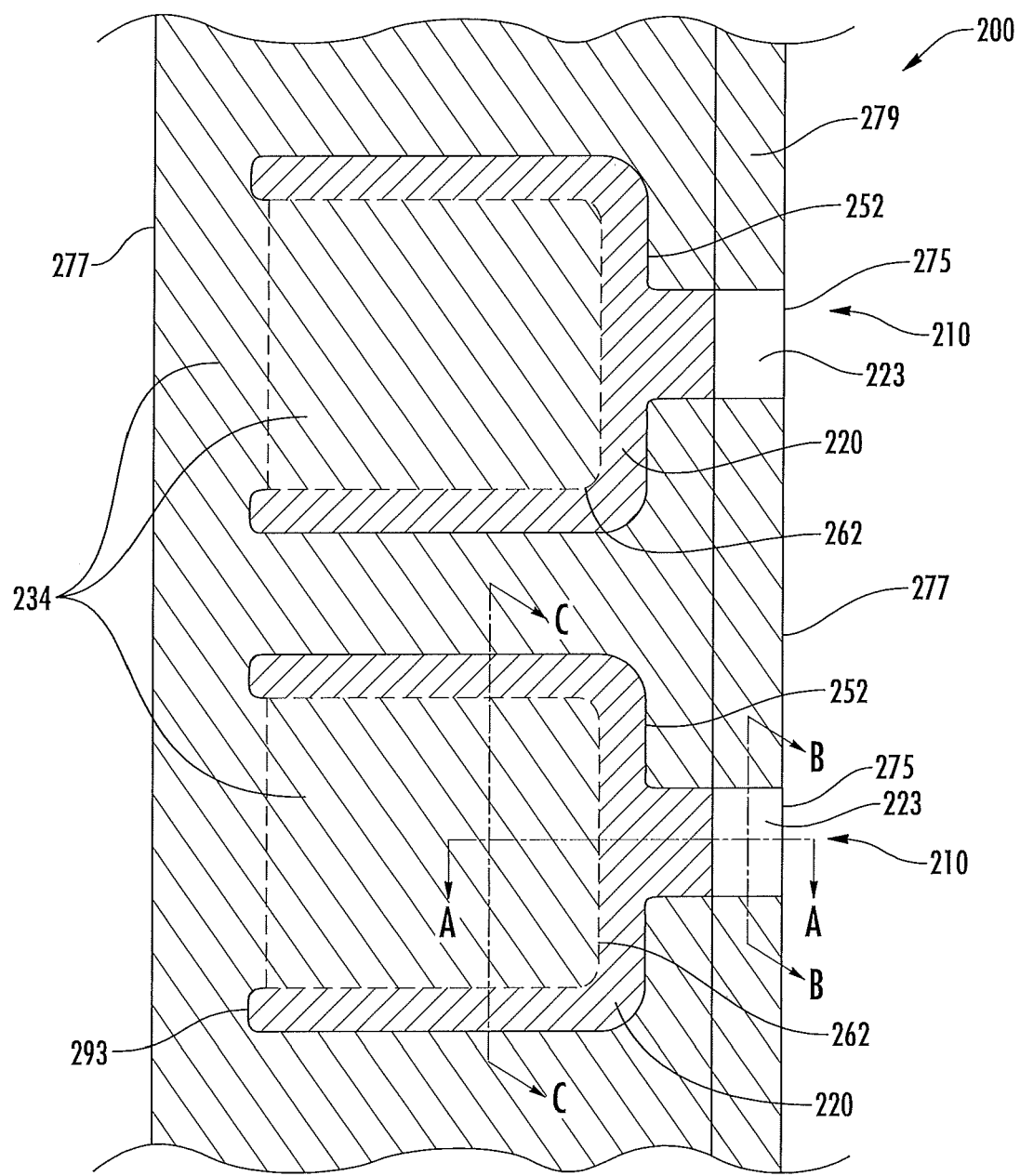
Figure 16B:
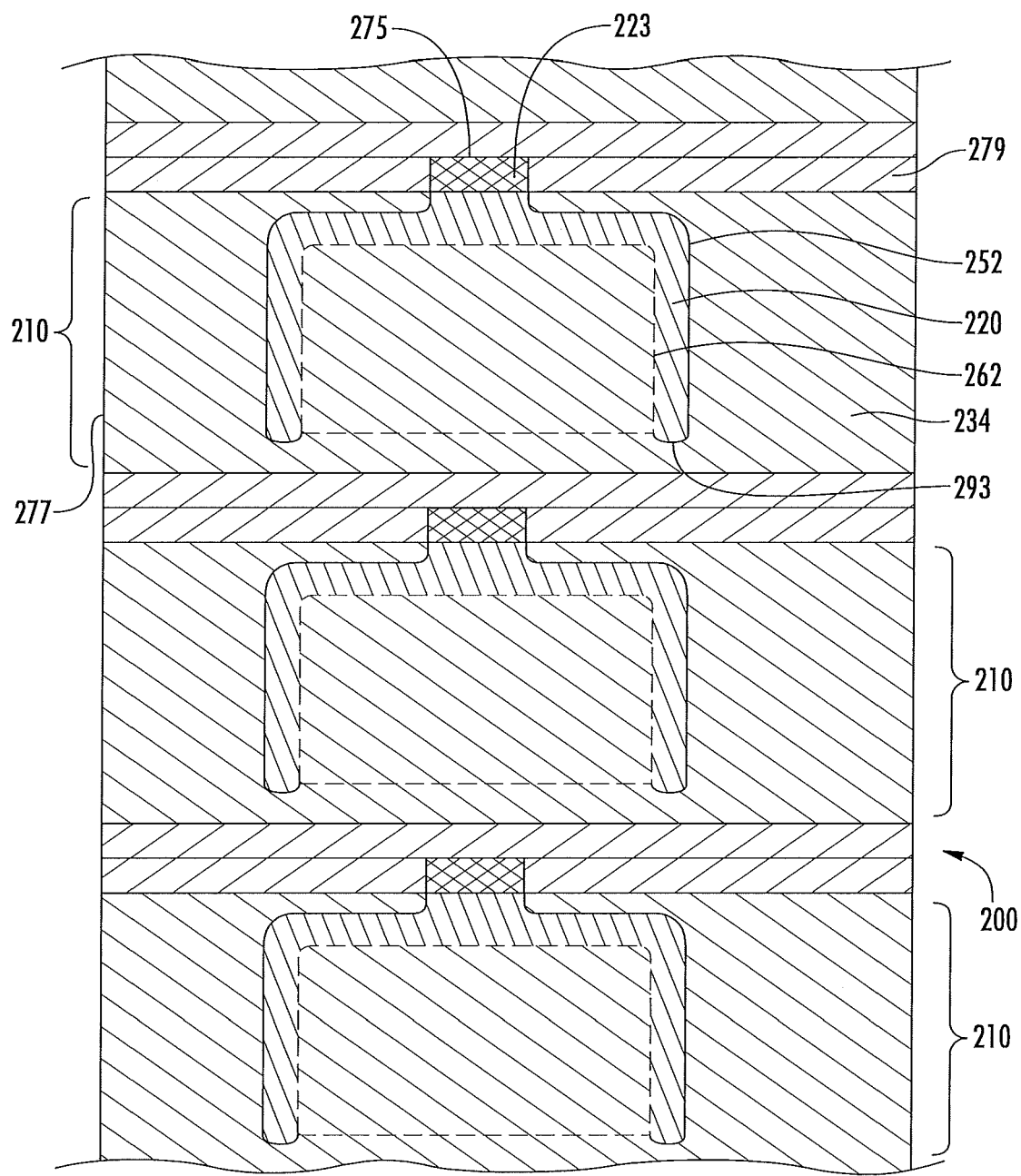

Having thus described the disclosure in general terms, reference will now be made to the accompanying drawings, which are not necessarily drawn to scale, and wherein:

FIG. 1 is a diagrammatic depiction of a first phase of a manufacturing method for making a flexible packaging structure in accordance with one embodiment of the invention;

FIG. 1a is a view of the first structure along line 1a-1a in FIG. 1;

FIG. 1b is a view of the first structure along line 1b-1b in FIG. 1;

FIG. 2 is a diagrammatic depiction of a second phase of the method in accordance with one embodiment of the invention;

FIG. 3 is a diagrammatic depiction of a second phase of the method in accordance with another embodiment of the invention;

FIG. 4 is a perspective view of a package that can be formed from a flexible packaging structure made in accordance with embodiments of the invention;

FIG. 5 shows the package of FIG. 4 after being opened;

FIG. 6 is a cross-sectional view along line 6-6 in FIG. 4;

FIG. 7 is a cross-sectional view along line 7-7 in FIG. 5;

FIG. 8 is a perspective view of stand-up pouch that can be formed from a flexible packaging structure with a tamper-evidence feature made in accordance with embodiments of the invention;

FIG. 9 is a perspective view of another stand-up pouch that can be formed from a flexible packaging structure with a tamper-evidence feature made in accordance with embodiments of the invention;

FIG. 10 is a perspective view of yet another stand-up pouch that can be formed from a flexible packaging structure with a tamper-evidence feature made in accordance with embodiments of the invention;

FIG. 11 is a perspective view of an additional stand-up pouch that can be formed from a flexible packaging structure with a tamper-evidence feature made in accordance with embodiments of the invention;

FIG. 12 shows a perspective view of a package with a container body and having a temper-evidence feature in accordance with the invention;

FIG. 13 shows a perspective view of a package that can be formed from a flexible packaging structure made in accordance with embodiments of the invention;

FIG. 14 shows the package of FIG. 13 after being opened;

FIG. 15 is a perspective view of stand-up pouch that can be formed from a flexible packaging structure made in accordance with embodiments of the invention;

FIGS. 16A-B are top views of packaging structures that can be formed into packages in accordance with embodiments of the invention; and FIGS. 17A-D are cross-sectional views of a packaging structure in accordance with embodiments of the invention.

DETAILED DESCRIPTION OF THE DRAWINGS

The present inventions now will be described more fully hereinafter with reference to the accompanying drawings, in which some but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As an initial overview of preferred embodiments of the invention, a flexible packaging laminate is constructed to have a built-in opening and reclose function and a tamper-evidence feature. The laminate is constructed as a multi-layer structure by adhesively laminating a first structure to a second structure, wherein each of the first and second structures comprise one or more layers of flexible material. Pressure-sensitive adhesive is applied to one of the structures before lamination. Once the laminate is formed in this manner, scoring operations are performed on both sides of the laminate, but each scoring operation penetrates only through a part of the thickness of the laminate; in particular, a scoring operation performed on the side of the laminate adjacent the first structure results in penetration through the first structure, but without complete penetration through the second structure, and preferably without any substantial penetration, and more preferably without any penetration, into the second structure. Likewise, the scoring operation performed on the side of the laminate adjacent the second structure results in penetration through the second structure, but without complete penetration through the first structure, and preferably without any substantial penetration, and more preferably without any penetration, into the first structure. The scoring operation also forms the tamper-evidence feature, as further described below.

More particularly, with reference to FIG. 1, a first phase of the manufacturing process is depicted. A first structure 10 is advanced from a supply roll 12 by suitable web driving and handling equipment (not shown) to an optional print station 14 comprising a printing apparatus, such as a rotogravure printer or the like, for printing graphics and/or indicia on the first structure by applying inks to a surface of the first structure. The first structure 10 comprises one or more layers of flexible packaging material. Various materials can be used for the layer(s) of the first structure, including polymers such polyesters, polyolefins (including homopolymers and copolymers), polyamides, and others; paper; metal foil; and the like. In a preferred embodiment of the invention, the first structure 10 includes an outer layer (not illustrated) that is substantially transparent and is reverse-printed in the print station 14, i.e., the inks are applied to the surface of the first structure 10 that is subsequently laminated to another structure, as described below, from the opposite side of the first structure, which will form an exterior of a package constructed from the packaging laminate, the inks are visible through the first structure. As an example, the first structure 10 can comprise a layer of polyester such as polyethylene terephthalate or the like.

Prior to printing the first structure in the print station, the surface of the first structure that is subsequently laminated to the other structure can be treated by a corona discharge or flame treatment apparatus 16 to render the surface more receptive to the inks and/or to render the surface more readily bondable to the pressure-sensitive adhesive that is subsequently applied to the surface as described below. Alternatively, the first structure 10 can have already been so treated prior to being wound into the supply roll 12, such that the treatment apparatus 16 is unnecessary.

Following the optional corona/flame treatment and/or optional printing operation, and with reference to FIGS. 1 and 1a, the first structure 10 is advanced to a first adhesive application station 18 at which a pressure-sensitive adhesive 20 is applied to the first structure in a predetermined pattern 22 that recurs at regular intervals along the lengthwise direction of the first structure. The predetermined pattern 22 is generally in the form of a strip of various forms or shapes. As illustrated, a preferred shape for the strip pattern 22 is generally U-shaped, for reasons that will become apparent in the description of FIGS. 4-8; however, other shapes for the pattern 22 can be used, the invention not being limited to any particular pattern. The pattern can include a region 23 that is free of adhesive and will ultimately form a thumb tab or grasping portion of the first structure 10 as further described below. It is also possible in alternative embodiments to flood-coat the pressure-sensitive adhesive onto the entire surface of the first structure.

The pressure-sensitive adhesive 20 can comprise various compositions. Pressure-sensitive adhesives form viscoelastic bonds that are aggressively and permanently tacky, adhere without the need of more than a finger or hand pressure, and require no activation by water, solvent or heat. Pressure-sensitive adhesives are often based on non-cross-linked rubber adhesives in a latex emulsion or solvent-borne form, or can comprise acrylic and methacrylate adhesives, styrene copolymers (SIS/SBS), and silicones. Acrylic adhesives are known for excellent environmental resistance and fast-setting time when compared with other resin systems. Acrylic pressure-sensitive adhesives often use an acrylate system. Natural rubber, synthetic rubber or elastomer sealants and adhesives can be based on a variety of systems such as silicone, polyurethane, chloroprene, butyl, polybutadiene, isoprene, or neoprene. When the packaging laminate of the invention is to be used for food packaging, the pressure-sensitive adhesive 20 generally must be a food-grade composition. Various pressure-sensitive adhesives are approved by the U.S. Food and Drug Administration for use in direct food contact, as regulated by 21 CFR Part 175.300. A preferred food-grade pressure-sensitive adhesive 20 for use in the present invention is Jonbond 743 available from Bostik Findley. Additives (e.g., particulates or the like) can be added to the pressure-sensitive adhesive 20 to reduce the tenacity of the bond to the underlying second structure 42, if necessary, so that the pressure-sensitive adhesive 20 readily detaches from the second structure on opening (particularly on the very first opening).

When applied in a pattern as opposed to being flood-coated or applied everywhere on the first structure 10, the pattern 22 of pressure-sensitive adhesive 20 is applied to the first structure 10 at regular intervals along the first structure 10. The spacing or index distance d between the patterns 22 can correspond to a dimension, such as a length, of packages to be produced from the packaging laminate.

The adhesive application station 18 can comprise any suitable device capable of accurately applying the pressure-sensitive adhesive 20 to the first structure 10 in the desired pattern 22, at regular intervals along the structure. For example, as shown, the adhesive application station can comprise a gravure roll 24 that picks up the pressure-sensitive adhesive 20 from a reservoir 26 on the outer surface of the roll such that the adhesive fills one or more recessed areas in the surface. A doctor blade 28 scrapes off excess adhesive so that it remains essentially only in the recessed area(s). The first structure 10 is contacted by the gravure roll 24; a backing roll 30 provides support on the opposite side of the first structure 10.

After application of the pressure-sensitive adhesive 20, the first structure 10 is advanced to a dryer 31 such as an oven or the like, to dry the pressure-sensitive adhesive 20. In the case of the pressure-sensitive adhesive 20 being pattern-applied, the first structure 10 is then advanced to a second adhesive application station 32 at which a permanent laminating adhesive 34 (FIG. 1b) is applied to the first structure 10 in such a manner that a sufficiently large proportion of the surface is covered by the permanent adhesive 34 to permit the first structure 10 to be adhesively attached to a second structure 42 at a downstream laminating station 40. The permanent adhesive 34 does not cover the pressure-sensitive adhesive 20. Furthermore, when the pattern of pressure-sensitive adhesive 20 includes an adhesive-free region to form a thumb tab or grasping portion 23 as previously noted, the pattern of the permanent adhesive also does not cover the adhesive-free region. Thus, the permanent adhesive 34 must be applied by an apparatus capable of accurately applying the adhesive in a predetermined pattern, in registration with the pressure-sensitive adhesive 20 but not covering it or the adhesive-free region if present. A suitable adhesive application device 32, as shown, can be a gravure roll 24 of the type previously described. The permanent adhesive 34 can comprise various compositions. Suitable examples include two-component polyurethane adhesive systems, such as Tycel 7900/7283 available from Henkel. After the application of the permanent adhesive 34, the first structure 10 is advanced to a dryer 33 such as an oven or the like. Alternatively, when the pressure-sensitive adhesive 20 is applied to the entire surface of the first structure 10, the steps of applying and drying the permanent adhesive 34 are skipped.

The first structure 10 is then advanced to a laminating station 40, comprising a pair of rolls forming a nip therebetween. The first structure 10 is passed through the nip along with a second structure 42 that is advanced from its own supply roll 44, and the first and second structures 10/42 are laminated to each other. The second structure 42 comprises one or more layers of flexible material, and is coextensive with the first structure 10—i.e., the width of the second structure 42 is substantially equal to the width of the first structure 10 and the longitudinal edges of the second structure 42 substantially coincide with the longitudinal edges of the first structure 10. The resulting laminate 46 is then advanced to a reel-up (not shown) where it is wound into a roll for subsequent processing in the second phase of the manufacturing process as described below. Alternatively, it is possible for the reel-up operation to be omitted, such that the laminate is directly advanced to the second phase.

With reference to FIGS. 2 and 6, the second phase of the process is now described. A supply roll 48 of the laminate 46 formed in the first phase of the process is shown. The laminate is advanced from the supply roll to a first scoring station 50 at which a first, or outer, score line 52 (FIG. 6) is formed through the thickness of the first structure 10. When the pressure-sensitive adhesive 20 has been pattern-applied, the first score line 52 is in registration with (i.e., coincides with) the outer perimeter 22a (FIG. 1a) of the strip-shaped pattern 22 of pressure-sensitive adhesive 20. The first score line 52 extends substantially through the thickness of the first structure 10, but preferably does not extend to any substantial extent into the second structure 42, as illustrated in FIG. 6.

The first scoring station 50 can comprise a laser 54 as depicted in FIG. 2. The use of lasers for scoring through flexible materials is generally known, for example as described in U.S. Pat. No. 5,158,499, incorporated herein by reference. The depth of the score line formed by the laser can be regulated by regulating the power output or beam intensity of the laser beam, the width or spot size of the laser beam, and the amount of time a given spot on the film surface is irradiated by the beam. These factors generally are selected based on the characteristics of the material being scored. Some materials are more readily scored by lasers than other materials, as known in the art.

As noted, the first score line 52 must be in registration with the outer perimeter 22a of the pressure-sensitive adhesive strip 20 (and the outer perimeter of the thumb tab 23, if present). To accomplish this registration, the operation of the laser 54 is controlled to be synchronized with the advancement of the laminate 46. A sensor 56 disposed adjacent the laminate 46 can be used for detecting a feature on the laminate whose location in relation to the strip of pressure-sensitive adhesive 20 is known, and the sensor's output signal can be used by a suitable controller (not shown) for controlling the laser 54.

The first score line 52 may also include one or more tear portions 65 as a tamper-evidence feature. A tear portion 65 may comprise one or more interrupted areas 57 in which the first structure 10 is not cut or scored, and whose uncut condition is readily apparent from a visual inspection of the first structure 10. The interrupted areas 57 are located such that when the flap or outer opening portion 86 bounded by the first score line 52 is peeled back to create an opening through the laminate, the first structure 10 tears through the interrupted areas 57 to connect the two portions of the first score line 52 on opposite sides of each interrupted area 57. To help ensure that the two portions of the score line will be connected even if the tear line tends to wander in direction, the score line 52 at the "downstream" side of each interrupted area 57 can terminate in a U- or V-shaped portion 58 that extends generally transverse to the direction along which the score line 52 extends. The "downstream" side refers to the side of the interrupted area 57 that is located farthest along the downstream direction (generally left-to-right in FIGS. 4 and 5) in which the outer opening portion 86 is peeled back when opening the package. The first structure 10 is cut through its thickness along the transverse portions 58, similar to the rest of the score line 52. Accordingly, even if the tear line wanders to one side or the other, it will connect with the transverse portion 58 and thereby allow the score line 52 to continue to sever or separate as the outer opening portion 86 is peeled farther back.

Next, the laminate is advanced to a second scoring station 60 at which a second, or inner, score line 62 is formed through the thickness of the second structure 42. When the pressure-sensitive adhesive 20 has been pattern-applied, the second score line 62 is in registration with (i.e., coincides with) the inner perimeter 22b (FIG. 1a) of the strip-shaped pattern 22 of pressure-sensitive adhesive 20. The second score line 62 extends substantially through the thickness of the second structure 42, but preferably does not extend to any substantial extent into the first structure 10, as illustrated in FIG. 6. The second score line 62 is spaced inwardly of the first score line 52 so as to define an inner opening portion 88 of smaller area than the outer opening portion 86. As further described below, the inner opening portion 88 is adhered to the outer opening portion 86 (either by the permanent adhesive when present, or by the pressure-sensitive adhesive 20 when it is applied everywhere between the two structures 10, 42), such that both portions 86, 88 are lifted together when opening the package.

As shown in FIGS. 4 and 5, preferably the interrupted areas 57 are located with respect to the second score line 62 such that in order to lift the outer opening portion 86 far enough to just begin lifting the inner opening portion 88 and thereby begin to create an opening into the package, the interrupted areas 57 must be torn through. In this regard, the downstream side of each interrupted area 57 (which coincides with the vertex of the U- or V-shaped transverse score line 58) preferably is not farther along the downstream direction, or at least is not substantially farther along the downstream direction, than is the most-upstream portion of the second score line 62.

The second scoring station 60 can comprise a laser 64. The operation of the laser 64 is synchronized with the advancement of the laminate in a manner as described above. A sensor 66 can detect a feature, such as an eye mark, on the laminate whose location in relation to the pressure-sensitive adhesive strip 20 is known, and the sensor 66 output can be used for regulating the laser operation so that the second score line 62 is in registration with the inner perimeter of the pressure-sensitive adhesive strip 20.

As an alternative to the use of lasers for scoring the laminate, the score lines 52, 62 can be formed in the laminate by mechanical scoring or cutting. For instance, as depicted in FIG. 3, a first scoring station 50' can comprise a kiss roll 51 and backing roll 53 that form a nip through which the laminate is passed. The kiss roll 51 comprises a rotary cutting die defining a cutting edge (not shown). The kiss roll acts in conjunction with the backing roll to cut partially through the thickness of the laminate starting from the outer surface of the first structure 10, such that the first structure 10 is substantially scored through while the second structure 42 is left intact. The second scoring station 60' likewise comprises a kiss roll 61 and backing roll 63 for scoring through the second structure 42.

Additionally, it is within the scope of the invention to laser-score one side of the laminate and to kiss cut or otherwise mechanically score the other side. This can be advantageous, for example, when one of the structures making up the laminate is readily scored by a laser but the other structure is not. For instance, when the first structure 10 is a polyester such as PET, it can readily be scored with a laser, but if a polyethylene heat seal layer is employed on the opposite side, laser scoring may not be the best choice because polyethylene does not score well with a laser. In this case, kiss cutting or other mechanical scoring can be used to score the inner structure 42.

After the scoring operations, the laminate 46 can be sent to a reel-up (not shown) and wound into a roll for subsequent processing. The laminate can also be slit into a plurality of partial widths and wound into multiple rolls. In this latter instance, each partial width would have the recurring patterns of pressure-sensitive and permanent adhesives applied with suitably configured adhesive applicators to the full-width material, and would have the recurring score lines formed by suitably configured scoring devices acting on either the full-width laminate prior to slitting or acting on each partial-width portion after slitting.

An advantage of the invention, versus the formation of a web having discrete labels applied to a partial portion of the web surface as in the prior art, is that the laminate has a uniform thickness throughout (because the first and second structures are coextensive) and therefore winds well into good-quality rolls. In contrast, a web with labels centrally located in the width of the web tends to produce wound rolls that are soft in the radial direction at the two ends of the roll where the labels are not present. Additionally, the web with labels is much thicker than laminates made in accordance with the invention, and hence the laminates of the invention can achieve a greater square footage per roll of a given diameter. As already noted, a further drawback to the use of labels is the necessity of applying the labels to the web in an "off-line" process, which often entails shipping a roll of the web to a converter that applies the labels and then ships the roll back to the package manufacturer. In the process of the invention, the manufacture of the laminate and the incorporation of the opening/reclose and tamper-evidence features in the laminate are conducted in an in-line fashion as part of the same overall process. The process of the invention thus is much more efficient and less costly.

Additionally, the invention avoids other drawbacks associated with the use of labels. More specifically, pressure-sensitive adhesive labels typically require a release liner that is peeled off and thrown away, which represents waste, and create a potential choke hazard. Furthermore, there is the additional waste of the skeleton material left over after die-cutting the labels from the label web material. The present invention eliminates such waste and attendant costs.

Some possible applications for the resulting laminate are now explained with reference to FIGS. 4-11. FIGS. 4 and 5 show a flexible package 70. The package includes an outer wrapper 74 that envelopes the package contents and is sealed to enclose the contents. The outer wrapper 74 comprises a packaging laminate made by a method in accordance with the invention, such as the laminate 46 previously described. The outer wrapper 74 is manipulated into a tubular shape and the longitudinal edges of the wrapper 74 are sealed together by a suitable sealant material to form a longitudinal seal (not shown), typically adjacent the bottom surface of the package. The opposing portions of the wrapper 74 are sealed together along transverse seal lines 76, 78 adjacent the opposite ends of the tubular wrapper. The ends of the wrapper 74 can be gusseted if desired, as known in the art.

In the illustrated package, the portion of the outer wrapper 74 having the score lines 52, 62 is provided to be on the top surface of the package. The area of the wrapper 74 bounded by the score lines can constitute any fraction of the total top surface of the package, but advantageously the area is a majority of the total surface area of the top surface.

Based on the previous description of the laminate 46 and its formation process, it will be appreciated that the presence of the score lines 52, 62 has little or no impact on the barrier function of the outer wrapper 74 because each score line extends only partially through the total thickness of the wrapper 74 and the score lines are not aligned with each other. Additionally, the pressure-sensitive adhesive 20 fills the space between the score lines so that even if the score lines overlap somewhat in the thickness direction, there is still no open route between them. Furthermore, the score lines typically have a small width, on the order of a few thousandths of an inch.

Various materials can be used for the construction of the outer wrapper 74. With reference to FIG. 6, in the illustrated embodiment, the first structure 10 that forms the outer surface of the wrapper 74 comprises a single layer 80 of flexible material. The layer 80 can comprise various materials. A preferred material is a polyester such as polyethylene terephthalate (PET). As noted, the PET layer can be reverse-printed if desired, although alternatively it can be printed on its exterior and covered by an over-lacquer (not shown). The second structure 42 forming the inner surface of the wrapper 74 comprises a barrier layer 82 and a sealant layer 84. The sealant layer 84 constitutes the innermost surface of the wrapper 74, and can comprise various sealant materials such as heat seals or cold seals. Heat seals generally are preferred because they provide stronger seals than cold seals typically are capable of achieving. Any suitable heat seal materials can be employed, such as polyethylene, polypropylene, ionomer resins such as SURLYN®, or others.

The barrier layer 82 can comprise any of various barrier materials including barrier polymer films such as: ethylene vinyl alcohol copolymer (EVOH), polyamide, and the like; metallized polyolefin films such as polyethylene, polypropylene, oriented polypropylene, and the like; AlOx-coated polymer films; SiOx-coated polymer films; metal foil; and others.

The barrier layer 82 and sealant layer 84 can be joined in various ways, including adhesive lamination, extrusion lamination, or coextrusion.

Advantageously, the laminate includes a metallization layer or a metal foil layer between the first structure 10 and the second structure 42, for example by providing a metallization layer 85 on the surface of the layer 82 that faces the first structure 10. This is beneficial in enhancing the barrier performance of the laminate as already noted. Additionally, however, the metallization layer or 85 metal foil layer can also be helpful when a laser is used for scoring the second structure 42. In particular, when the sealant layer 84 comprises polyethylene, which is not as readily scored by laser as some other materials such as polyester, it can be difficult to employ a sufficiently high laser energy to score through the polyethylene sealant layer without scoring through the laminate more deeply than desired. In some cases, the entire thickness of the laminate may be scored through, which is undesirable. The metallization layer or metal foil layer can be helpful in "tuning" the laser to penetrate only up to the metallization layer 85 or foil layer.

The function of the opening/reclose and tamper-evidence features provided by the pattern-applied adhesives and the score lines will now be described. With reference to FIGS. 4 and 6, the package 70 is shown in a closed condition, for example as initially filled and sealed in a packaging plant. On the top surface of the outer wrapper 74, the first or outer structure 10 is adhesively joined to the second or inner structure 42 via the permanent adhesive 34. The first score line 52 bounds an outer opening portion 86 of the outer structure 10. In this embodiment, the outer opening portion 86 has a generally U-shaped perimeter having three sides defined by the score line 52, and is attached to the remainder of the outer wrapper 74 along a fourth side (i.e., an imaginary line extending between the free ends of the two legs of the U-shaped score line 52). The second score line 62 is generally parallel to the first score line 52, but is spaced inwardly of the outer score line so as to define an inner opening portion 88 of smaller area than the outer opening portion 86; the second score line 62 can be a closed curve such as a rectangle, or can be generally U-shaped like the first score line 52, as desired. In any event, there is a marginal region 90 of the outer opening portion 86 that extends beyond the edge of the inner opening portion 88. The pressure-sensitive adhesive 20 is disposed between this marginal region 90 and an underlying surface 92 of the inner structure 42. The outer opening portion 86 and inner opening portion 88 are permanently joined by the permanent adhesive 34 when present, or by the pressure-sensitive adhesive when it is applied everywhere between the structures.

The first score line 52 includes the interrupted areas 57 and transverse score lines 58 as previously described. Prior to initial opening of the package, the uncut condition of the interrupted areas 57 is readily apparent, such that the consumer can see that the package has not yet been opened.

When the outer opening portion 86 is detached from the outer wrapper along the first score line 52 and is peeled back as in FIG. 5, the outer layer of the wrapper tears through the interrupted areas 57. The inner opening portion 88 remains affixed to the outer opening portion and comes with it, thereby creating an opening 94 in the top surface of the outer wrapper 74 as defined by the second score line 62. The outer and inner opening portions essentially form a flap that remains attached along a hinge line defined between the free ends of the two legs of the U-shaped score lines.

The package is reclosable by re-attaching the pressure-sensitive adhesive 20 to the surface 92 of the inner structure 42 to restore the package to a closed condition as shown in FIG. 6. It will, however, be readily apparent that the package has already been opened, because the film will be torn through the tear portions 65. No amount of care in replacing the flap in its original position can erase the fact that the interrupted areas have been torn through. Accordingly, the invention provides a reliable tamper-evidence feature that is not easily circumvented. Furthermore, in some embodiments, the outer structure 10 can be substantially non-transparent or opaque without compromising the functionality of the tamper-evidence feature; this is in contrast to some prior-art structures in which the outer structure must be transparent because the tamper-evidence feature is formed in the inner structure and is covered by the outer structure. The non-transparent or opaque character of the outer structure 10 can be a characteristic of the film material itself, or can be achieved by a coating of ink or the like on the film.

The outer structure 10 preferably has a greater affinity for bonding with the pressure-sensitive adhesive 20 than does the surface 92 of the inner structure 42, and hence the pressure-sensitive adhesive 20 is detached from the surface 92 and remains attached to the marginal region 90 of the outer opening portion 86 as shown in FIGS. 5 and 7. The greater bonding affinity of the outer structure 10 can be achieved in various ways. When the outer structure comprises a layer of PET and the layer 82 of the inner structure to which the pressure-sensitive adhesive is attached comprises a polyolefin such as polypropylene, oriented polypropylene, or metallized oriented polypropylene, the PET will naturally have a greater affinity for bonding to the adhesive than will the polyolefin layer. Additionally or alternatively, the surface of the outer structure 10 can be treated, as previously noted, by corona discharge or flame treatment, to increase the surface energy and enhance the bonding affinity. It is also possible, as already noted, to control the bond strength of the pressure-sensitive adhesive to the layer 82 by including an additive in the adhesive to reduce the bond strength, if desired.

Although it is preferred to have the pressure-sensitive adhesive be applied to the outer structure and to remain on the outer structure upon opening, it is also within the scope of the invention to apply the pressure-sensitive adhesive to the inner structure and to remain on the inner structure upon opening. This is less preferred, however, because of the greater tendency for crumbs or the like from the contained products to become adhered to the pressure-sensitive adhesive and thereby reduce its adhesiveness with repeated openings and reclosings. It is believed that this tendency is reduced when the pressure-sensitive adhesive remains with the outer structure, since it is out of the way of the package opening when products are being removed.

It will be appreciated from the above description that laminates made in accordance with the invention provide a tamper-evidence function for a package because after opening it is impossible to replace the opening portions 86, 88 in such a way as to completely restore the package to its original unopened condition, as previously noted. When printing is included on the laminate, it is even more noticeable when the package has been opened because it is difficult to achieve perfect registration of the printed matter across the score line when reclosing the package.

The printing on the laminate can include text adjacent to the interrupted areas 57 of the first score line 52, calling the consumer's attention to the presence of the interrupted areas and indicating that if they are torn through at a tear portion 65, the consumer should not purchase the package.

The laminates made in accordance with the invention can be used for forming other types of packages or tamper-evidence features. For instance, FIG. 8 shows a stand-up pouch 100 constructed from the laminate 46 as described above. The first score line 52 and second score line 62 are formed in a side wall of the pouch. The opening/reclose and tamper-evidence features operate in a manner similar to that described above. An alternative form of a thumb "tab," 25 is included, wherein a corner portion of the outer flap defined by the first score line 52 is left free of pressure-sensitive adhesive 20.

Similarly, FIG. 15 shows an embodiment of a stand-up pouch 100 constructed from the laminate as described herein. The first score line 52 and second score line 62 are formed in a side wall of the pouch. The opening/reclose and tamper-evidence features may, in an embodiment, operate in a manner similar to that described above. A pull tab 25 is included which extends from an edge of outer portion 86. Preferably, tab 25 is defined by first score line 52 and is free from pressure sensitive adhesive 20 or lamination to the second structure 42. Alternatively, the area of tab 25 may be deadened with respect to any adhesive positioned therein. In an embodiment, the edge 275 of tab 25 is continuous with the edge 276 of the pouch. In an embodiment, some or all of the tab 25 is positioned within the heat seal area of the pouch, adjacent the seal line 76. In this embodiment, the end of tab 25 may be attached or anchored or along the transverse seal line 76.

The packages illustrated in FIGS. 9, 10 and 11 show other stand-up pouches 100 with alternative types of tamper-evidence features. In particular, the stand-up pouch 100 of FIG. 9 includes a tab 25 that extends from an edge of outer portion 86. Preferably, tab 25 is defined by first score line 52 and is free from pressure sensitive adhesive 20 or lamination to the second structure 42. The end of the tab 25 is then attached or anchored to a portion of the outer layer 74 or along the transverse seal line 76. The tab 25 illustrated in FIG. 9 may also include an indentation 55 between the outer portion 86 and where the end of tab 25 is attached to the stand-up pouch 100. By forming the tab 25 in this way, a user may easily access an underside of the tab 25 with a finger and open the stand-up pouch 100 by pulling the tab generally along the downstream direction (generally top-to-bottom in FIGS. 8-10). By pulling on the tab 25 in this way, the tab 25 will tear at or near the indentation 55, or tear portion 65, and allow the stand-up pouch 100 to open. Thus, the stand-up pouch 100 cannot be opened without introducing a tear into the tab 25 thereby creating a tamper-evidence feature that is clearly visible.

The stand-up pouch 100 of FIGS. 10 and 11 show other embodiments of tab 25 with a tamper-evidence feature. In FIG. 10, tab 25 also is defined by first score line 52 and extends from an edge of outer portion 86. The end of the tab 25 is attached or anchored to a portion of the outer layer 74 or along the transverse seal line 76 and is free from pressure sensitive adhesive 20 or lamination to the second structure 42. The tab 25 in FIG. 10 includes a prong 59 extending from a side of the tab 25 between the outer portion 86 and where the end of tab 25 is attached to the stand-up pouch 100. The presence of prong 59 facilitates the task of a user tearing through a portion of the tab 25 at a tear portion 65 before opening the stand-up pouch 100 by providing a surface that is easily grasped.

The embodiment in FIG. 11 includes two tabs 25 that include tear portions 65 in addition to a thumb tab 23. Both tabs 23 and 25 also are defined by first score line 52 and extend from an edge of outer portion 86 and are free from pressure sensitive adhesive 20 or lamination to the second structure 42. The end of tabs 25 are attached or anchored to a portion of the outer layer 74 or along the transverse seal line 76. In use, tab 23 may be used to open the pouch 100 and to assist in tearing through tear portions 65 of tabs 25.

It should be noted that the terms "line of weakness" and "score line" as used herein refer either to a complete cutting through the thickness of one or more layers of the laminate or to a partial cutting through of the thickness of such layer(s) allowing the layer(s) to be severed along the score line.

FIGS. 16A-B illustrate top view embodiments of rolls of flexible laminate 200 which may be utilized in the present invention. In roll 200, two flexible laminate structures 210 are shown, but it should be understood that a plurality of flexible laminate structures may be present on roll 200. In this embodiment, each laminate structure 210 contains an outer score line 252 in the outer film layer (optionally, precision overcut after lamination) and an inner score line 262 (optionally, precision undercut after lamination) in the inner film layer. Each structure 210 additionally comprises a tab 223. In an embodiment, the tab 223 is defined by the outer score line 252. The outermost edge 275 of tab 223, in an embodiment, may not be within the boundaries of the laminate (shown in FIG. 16A). That is, the outer score lines 252 may begin at one edge 277 of the laminate, sufficiently separated so as to create tab 223. In this embodiment, the outer score lines 252 may begin substantially perpendicular to the edge 277 of the laminate, with the edge 275 of the tab 223 being between the outer score lines 252 and substantially co-extensive, continuous, and/or aligned with the edge 277. In this embodiment, at least a portion of the tab 223, is positioned within the heat seal area 279 of the laminate. In an embodiment, the entirety of the tab 223 is positioned within the heat seal area 279 of the laminate.

As shown in FIG. 16B, the laminate structures 210 may be positioned such that the tab edge 275 is perpendicular to the edge of the laminate 277 in some embodiments. In this embodiment, the tab 223 will still be positioned within the heat seal area 279, but the heat seal area 279 will also be perpendicular to the edge of the laminate 277. The heat seal area 279 may comprise a length 281 that is approximately twice that of the length 282 of the tab 223. In this way, the heat seal can be simultaneously provided for opposite ends of the packaging. The heat seal area 279 may be cut at or near the edge 275 of the tab 223.

Figure 17A:
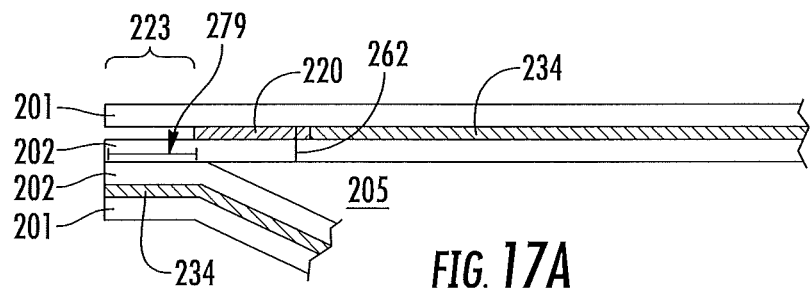

FIG. 17A illustrates a side view cross section of an embodiment of a package of the invention at the location of the tab 223, in the location of cross section A in FIG. 16A. In this view, an outer film 201 is shown adhered to an inner film 202. An adhesive-free region 204 is illustrated between film layer 201 and film layer 202 in the location of the tab 223. Film layers 201 and 202 may be adhered together using PSA 220 and a permanent adhesive 234, as shown. The adhesives may be applied in a pattern as is further described herein. A cut line 262 is shown which extends through the adhesive layer and the inner film layer 202. In some embodiments, the cut line 262 may extend fully through inner film layer 202. In other embodiments, the cut line 262 may extend only partially through inner film layer 202. In still other embodiments, the cut line 262 may comprise perforations in inner film layer 202. The cut line may not extend through the PSA layer 220 in some embodiments.

The cut line 262, in combination with the permanent adhesive 234, allows the portion of the inner film 202 between or within the cut lines 262 to be lifted with the outer layer 201, away from the remainder of the packaging, thereby exposing the interior 205 of the package. The outer layer 201 can then be re-adhered to the inner film 202 via the PSA region 202. It should be noted that in any of the embodiments discussed herein, the PSA region or the adhesive-free region may extend beyond or overlap the scored or cut lines, as shown in FIGS. 16-17, so as to ensure that the package can be opened without damage in the case of a slight misalignment of the registration during manufacture.

In an embodiment, inner layer 202 is adhered on a portion of its underside to a separate film layer (not shown), which may comprise more than one film layer. The separate film layer may comprise the bottom of the packaging structure. Film layers 202 and the separate film layer may be joined, in an embodiment, using a heat seal 279.

In another embodiment, inner layer 202 is rolled, folded or otherwise at least partially placed against itself and heat sealed (shown in FIG. 17A). In an embodiment, the heat seal is administered in at least the region of the tab 223. Thus in the final package, the heat seal region 279 may comprise at least the region of the tab 223, shown in FIG. 17A between the layers of film 202. The tab portion 223 of film layer 201 may remain unaffixed to film layer 202, even after heat sealing the film, due to the adhesive-free region 204. Thus, the tab 223 is located within the package heat seal region 279 and is available to be separated from the package for opening of the package after the package has been heat sealed.

Figure 17B:
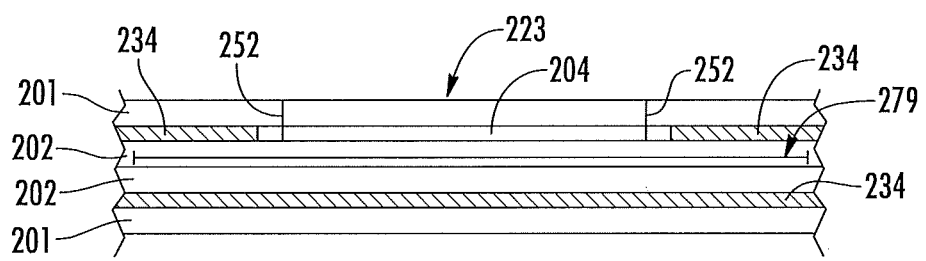

FIG. 17B illustrates a front view cross section of an embodiment of a package of the invention at the location of the tab 223, in the location of cross section B in FIG. 16A, when the package is closed. The figure illustrates the score lines 252 which comprise the outer edges of the tab 223 in outer film layer 201. The figure also illustrates the fact that the tab is presented within the heat seal region 279 of the package. Generally speaking, the heat seal 279 is shown between two layers of inner layer 202, which have been folded, rolled or stacked upon one another and heat sealed. In an embodiment, outer layer 201 is laminated to inner layer 202 with adhesive but is not otherwise heat sealable to inner layer 202. Thus, when the heat seal is applied to the area of the tab 223, the area between the two layers of 202 are heat sealed, but the tab 223 remains unaffixed to the structure.

Figure 17C:
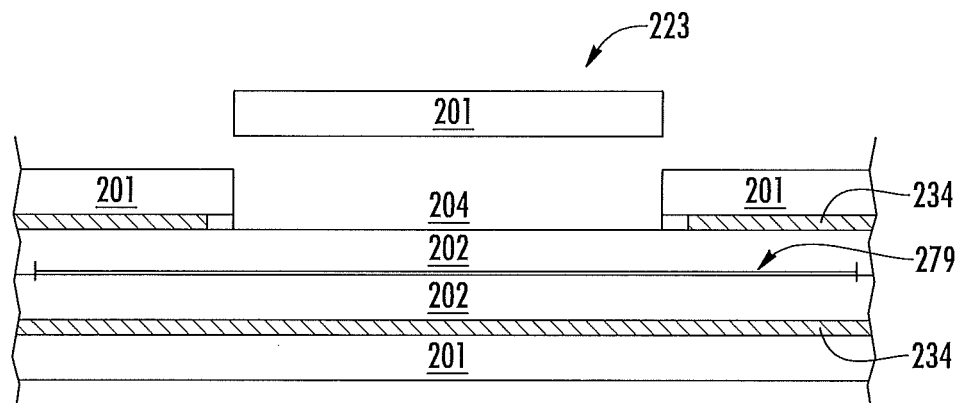

FIG. 17C illustrates a front view cross section of an embodiment of a package of the invention at the location of the tab 223, in the location of cross section B in FIG. 16A, when the tab 223 has been lifted away from the inner layer 202. In this embodiment, cut lines 252 and the adhesive-free region 204 allow the tab 223 to be separated from the remainder of outer film layer 201. The remainder of outer film layer 201 remains affixed to inner film layer 202 due to the permanent adhesive 234 disposed between the layers.

Figure 17D:
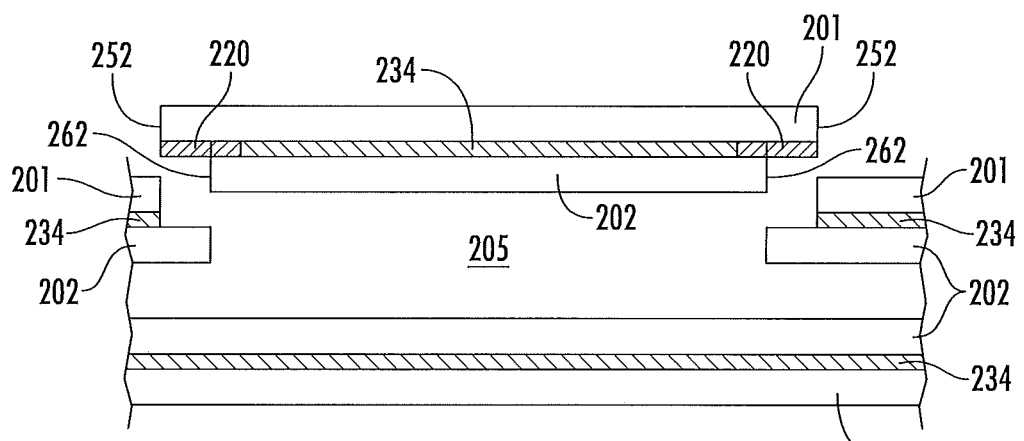

FIG. 17D illustrates a front view cross section of an embodiment of a package of the invention at the location of the tab 223, in the location of cross section C in FIG. 16A. In this figure, the tab has been pulled further upward or backward and the package is opened, illustrating the separation of the adhered outer and inner layers 201, 202 from the remainder of the package, and allowing access into the interior 205 of the package. In this embodiment, cut lines 262 allow the portion of film layer 202 which is between the lines 262 to separate from the remainder of film layer 202 and, due to the permanent adhesive 234 disposed between the layers, lift with film layer 201 upward or backward from the container. The heat seal 279 is not viewable in FIG. 17C because the cross section does not illustrate the tab portion 223.

As noted, the tab 223 area of the laminate, between film layers 201 and 202 may be adhesive-free, may contain PSA, or may contain an adhesive that has been deadened. The area between outer score line 252 and inner score line 262 may contain a layer of PSA 220, optionally flooded or pattern applied. As shown in FIG. 17A, the PSA area 220 may extend wider than or beyond the cut lines 252. Other than the tab 223 and the PSA area 220 discussed, the remainder of the laminate may contain a layer of permanent adhesive 234, optionally pattern applied. In various embodiments, the outer score line 252 may end in a j-hook 293 or other mechanism which prevents the tearing of the laminate.

Presenting the tab 223 within the heat seal area 279 of the package provides many advantages. As one example, the tab 223 can be accessed more easily in this configuration. Rather than searching the top or front surface of the package, a consumer immediately knows where to look for and access the tab 223. Because the tab 223 is aligned with the edge of the package, it can be identified, accessed, and lifted away from the package with ease, reducing customer frustrations. In addition, the laminate and packaging structures discussed herein have a lower cost of manufacture because the cutting/scoring process is less complicated and less waste is created in the manufacturing process. By aligning the edge of the tab with the laminate edge or along the cut line of the heat seal, an additional cut or angle need not be contemplated. A single cut (or no cut at all in the case of a tab aligned with a laminate edge) will suffice. Additionally, the waste created between the edge of the tab and the laminate boundaries may be reduced or eliminated.

As is known in the art, the packages described herein may be, in an embodiment, formed from the various laminate structures and then heat sealed together at one or more ends of the package. In an embodiment, the laminate structure is rolled or folded and sealed to itself to form a package. In another embodiment, the laminate structure is combined with and heat sealed to a separate web to form a package. At least one of the laminate structures may comprise components having thermoplastic properties to facilitate and improve the sealing properties of the heat seal. The heat seal may be obtained by bringing the laminate structures into contact with heat such that the thermoplastic components in the material melt and provides the heat seal. The heat seal may alternatively be obtained using any suitable method known in the art, for example, by hot air welding or conventional heat mold sealing.

The packages described above are formed by completely enveloping the contents in the flexible laminate. Alternatively, however, it is within the scope of the invention to employ the flexible laminate as a lidding stock for forming flexible lids that can be secured (e.g., by heat-sealing or the like) to a flange of a tray or other container that contains the contents. In this manner, the lid includes a built-in opening and reclose feature as previously described. For instance, FIG. 12 shows a package 110 comprising a container body 112 having a side wall 114 and a flange 116 extending from the upper edge of the side wall. The container body 112 can comprise various materials (e.g., polymer, paper, foil, etc.) and can be formed by various methods (e.g., thermoforming, molding, etc.). The open top of the container body is closed by a lid 118 formed of a flexible laminate 46 in accordance with the invention. The lid is sealed to the flange 116 by any suitable technique, such that the lid is firmly attached to the flange. The lid includes an opening/reclose feature formed by a first score line 52 and a second score line 62 and pressure-sensitive adhesive 20, and a tamper-evidence feature as previously described. The package 110 also includes a thumb "tab" 25 generally as described in connection with FIG. 8; alternatively, a thumb tab of the type shown in FIGS. 4 and 5 can be used.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of making a flexible package comprising applying a pressure-sensitive adhesive onto one surface of a first structure comprising at least one layer of flexible material;
adhesively joining the first structure to a second structure so as to form a laminate, the second structure comprising at least one layer of flexible material, wherein one of the first and second structures comprises an outer structure and the other comprises an inner structure;
advancing the laminate to a scoring station at which an outer score line is formed through the thickness of the outer structure and an inner score line is formed through the thickness of the inner structure in registration with the outer score line, the outer score line delineating a tab and an outer opening portion of the outer structure that is separable from the outer structure along the outer score line, the inner score line delineating an inner opening portion of the inner structure that is affixed to the outer opening portion and is separable from the inner structure along the inner score line, wherein a region of the outer opening portion between the outer and inner score lines is attached to an underlying surface of the inner structure via the pressure-sensitive adhesive, the outer opening portion being peelable from the underlying surface of the inner structure so as to cause the inner opening portion to also be peeled back to create an opening in the laminate, and the outer opening portion being re-attachable to the underlying surface of the inner structure via the pressure-sensitive adhesive for reclosing the opening; and
sealing at least one end of the laminate to form an end seal such that the tab is disposed at least partially within the end seal.

2. The method of claim 1, wherein an edge of the tab is aligned with an edge of the package.

3. The method of claim 1, wherein the tab is free from adhesion or lamination to the inner structure.

4. The method of claim 1, wherein the sealing step comprises heat sealing the at least one end of the laminate.

* * * * *